United States Patent
Kucharczyk (10) Patent No.: US 10,629,319 B2
(45) Date of Patent: Apr. 21, 2020

(54) X-RAY OPTICAL DEVICE

(71) Applicant: Rigaku Corporation, Tokyo (JP)

(72) Inventor: Damian Kucharczyk, Wroclaw (PL)

(73) Assignee: RIGAKU CORPORATION, Tokyo (JP)

( * ) Notice: Subject to any disclaimer, the term of this patent is extended or adjusted under 35 U.S.C. 154(b) by 160 days.

(21) Appl. No.: 15/892,531

(22) Filed: Feb. 9, 2018

(65) Prior Publication Data

US 2018/0240563 A1     Aug. 23, 2018

(30) Foreign Application Priority Data

Feb. 17, 2017   (EP) ..................................... 17156621

(51) Int. Cl.
*G01N 23/20*     (2018.01)
*G21K 1/04*      (2006.01)
*G21K 1/06*      (2006.01)

(52) U.S. Cl.
CPC ............. *G21K 1/067* (2013.01); *G01N 23/20* (2013.01); *G21K 1/04* (2013.01); *G21K 2201/064* (2013.01)

(58) Field of Classification Search
CPC ........... G01N 23/20; G21K 1/04; G21K 1/067
See application file for complete search history.

(56) References Cited

U.S. PATENT DOCUMENTS

| | | | |
|---|---|---|---|
| 9,052,271 B2 * | 6/2015 | Grodzins | ............. G01N 23/203 |
| 2003/0086534 A1 | 5/2003 | Seufert | |
| 2010/0086104 A1 | 4/2010 | Michaelsen et al. | |
| 2016/0225477 A1 * | 8/2016 | Banine | ............... G02B 27/0025 |

FOREIGN PATENT DOCUMENTS

DE          198 33 524 A1       7/1998

OTHER PUBLICATIONS

European Search Report dated Aug. 2, 2017.

* cited by examiner

*Primary Examiner* — David P Porta
*Assistant Examiner* — Fani Boosalis
(74) *Attorney, Agent, or Firm* — Dickinson Wright PLLC (57) ABSTRACT

An X-ray diffraction system includes an X-ray detector that is configured to detect diffracted X-rays diffracted from a sample when a surface of the sample is irradiated with X-rays. The apparatus may include a counter arm which rotates around a rotation center axis set within the surface of the sample while the X-ray detector is installed on the counter arm and a plate-like X-ray shielding member that is installed on the counter arm and rotated together with the X-ray detector.

16 Claims, 5 Drawing Sheets

Fig. 5

X-RAY OPTICAL DEVICE

PRIORITY CLAIM

This application claims the benefit of priority from European Patent Application EP17156621 filed Feb. 17, 2017, which is incorporated by reference in its entirety.

BACKGROUND

1. Field of the Invention

The present invention relates to generally relates to the field of X-ray analysis. More particularly, the invention relates to an X-ray optical device.

2. Description of Related Art

X-ray analysis techniques, such as X-ray diffraction (or XRD) have become very popular because they enable a non-destructive analysis of samples. For instance, X-ray diffraction has become one of the fundamental experimental techniques for investigating structural properties of crystalline samples of proteins or other macromolecules. Generally, the preparation of macromolecule samples in crystalline form is challenging. Usually, the samples are very small, and X-ray diffractometers are required which are capable of directing a focused X-ray beam with small cross-sectional size and high intensity onto the small samples.

Such X-ray diffractometers are described in DE 10 2004 052 350 A1 and US 2010/0086104 A1. These diffractometers include an X-ray source that emits X-rays, X-ray optics designed to image a beam of X-rays generated by the X-ray source onto a sample to be analyzed, a sample stage on which the sample to be analyzed is positioned, and an X-ray detector designed to detect the scattered X-rays.

As X-ray optics, reflective optics are employed comprising one or two multilayer mirrors (also known as Goebel or Montel optics) which are arranged and designed to image an X-ray beam with specific beam properties onto the sample. Since the design of the X-ray optics, such as the surface curvature of the mirrors is fixed and cannot be adjusted to specific experimental needs later on, it has to be decided at the stage of production of the optics which experimental needs should be met.

In X-ray diffraction, one relevant beam properties (or parameters) are the convergence angle and divergence angle of the focused beam, the beam intensity and the beam size at the focal point. The resolution of the X-ray diffractometer depends on the beam convergence and divergence angles and decreases with increasing convergence and divergence angles. On the other hand, the signal-to-noise ratio improves with increasing beam intensity, and the beam intensity increases with increasing convergence and divergence angles. Therefore, depending on the properties of the sample to be analyzed (i.e., whether the sample has a small or large unit cell) different convergence and divergence angles and therefore different X-ray optics are needed.

In order to tune the convergence and divergence angles of the imaged beam at the focal point, US 2009/0129552 A1 suggests using an adjustable aperture in order to occlude or cut away certain portions of the X-ray beam reflected by the X-ray optics. The adjustable aperture is arranged at or in the close proximity of the distal end of the optics (i.e. at the end facing away from the X-ray source) and is made of two angled plates, wherein at least one of the two angled plates can be linearly moved.

Adjustable apertures for occluding unwanted X-ray beam portions are also known from US 2010/0086104 A1. According to one implementation, the aperture is defined by two L-shaped aperture blades. At least one L-shaped aperture blade is movable by means of a high-precision micrometer screw or fine-thread bolt. Depending on the direction of rotation the screw is turned, the blade can be linearly moved forth or back so that the aperture opening size narrows or widens accordingly. According to another implementation, an aperture with fixed aperture opening size is suggested. In this embodiment, the aperture is movable as a whole in a plane perpendicular to the propagation of the X-ray beam. By appropriately moving the aperture relative to the X-ray beam, unwanted X-ray portions can be occluded so that only a beam portion with a desired convergence and divergence angle can pass the aperture opening. Again the linear movement of the aperture with respect to the X-ray beam is implemented by micrometer or fine-thread screws.

The above-described aperture designs have some drawbacks. First, micrometer screws or fine threaded screws are expensive and very sensitive to external influences. Further, apertures with micrometer screws are difficult to implement in a gas-tight housing in which the reflective optics are received. Still, further, aperture blade motion by micrometer screws is difficult to control because of motion parameters, such as start position, end stop, change of the sense of rotation, have to be precisely defined.

SUMMARY

An X-ray optical device includes an X-ray source configured to emit X-rays, an X-ray optics configured to image a beam of X-rays generated by the X-ray source onto a sample to be analyzed, a beam collimating device, and a beam blocking element arranged for selectively blocking off at least a portion of the X-ray beam output by the X-ray optics. The beam blocking unit has a rotating shaft and a beam blocking element, wherein the rotating shaft is rotatable around its axis and arranged laterally offset with respect to the X-ray beam output by the X-ray optics. The beam blocking element is mounted eccentrically on the rotating shaft such that the beam blocking element is movable into different beam overlap positions for blocking off desired beam portions when the beam blocking element is eccentrically rotated around the rotating shaft axis.

The beam portions blocked off by the beam blocking unit correspond to those beam portions of the output X-ray beam which are overlapped by the eccentrically rotating beam blocking element. The remaining unblocked (or non-overlapped) beam portions can pass through the beam blocking unit and propagate to the sample to be analyzed. The ratio between the unblocked beam portion and blocked beam portion can be continuously changed by rotating the beam blocking element into different beam overlap positions. Accordingly, unblocked beam portions with desired beam properties (i.e., with desired divergence angles, beam intensities, beam sizes or beam cross-sectional areas) can be easily adjusted by simply changing the angular position of the eccentrically rotating beam blocking element.

Since the beam blocking element and the rotating shaft rotate about the same rotating shaft axis, the beam overlap position reached by the beam blocking element may depend on the angle of rotation of the rotating shaft. Thus, by turning the rotating shaft by a specific angle of rotation, a specific beam overlap position for the beam blocking element can be reached. Accordingly, beam portions with desired convergence angles and divergence angles can be cut out by simply turning the rotating shaft about its axis.

By turning the rotating shaft around its axis, the eccentrically rotating beam blocking element may be movable between a predetermined minimum beam overlap position and a predetermined maximum beam overlap position. The minimum overlap position may be a position where the beam blocking element has a minimum overlap with the output X-ray beam. The maximum overlap position may be a position where the beam blocking element has a maximum overlap with the output X-ray beam. Accordingly, the beam portion of the X-ray beam which is not overlapped by the beam blocking element and which can pass through the beam blocking unit becomes smallest at the maximum overlap position and largest at the minimum overlap position.

The maximum overlap obtainable by the eccentrically beam blocking element may depend on the geometric dimensions of the beam blocking element, in particular on its lateral dimensions. According to one variant, the beam blocking element may be dimensioned such that it fully overlaps with the output X-ray beam in the maximum overlap position. According to an alternative variant, the beam blocking element may be dimensioned such that it only partially overlaps with the output X-ray beam. Beam overlaps in the range of 50% to 100% of the output X-ray beam may be conceivable for the maximum overlap position.

The minimum overlap obtainable by the eccentrically rotating beam blocking element may also depend on the geometric dimensions of the beam blocking element and its eccentric bearing on the rotating shaft. According to one variant the minimum overlap may also include the limit of no overlap between the beam blocking element and the output X-ray beam. Beam overlaps in the range of 0% to 40% of the output X-ray beam may be conceivable for the minimum overlap position.

The minimum overlap position and the maximum overlap position may each be associated with a specific angular position of the rotating beam blocking element and the corresponding rotating shaft. The beam blocking element may be designed and eccentrically mounted on the rotating shaft such that starting from the minimum overlap position the maximum overlap position can be reached by a 180° (or one-half) turn of the rotating shaft (and the corresponding beam blocking element). Moreover, the beam blocking element can reach any position between the minimum overlap position and the maximum overlap position by simply rotating the rotating shaft around its axis by a corresponding angle of rotation selected between 0° to 180°.

After having reached a maximum overlap position by a 180° degree turn of the rotation shaft, the beam blocking element can be further moved from the maximum overlap position back to the minimum overlap position by a further 180° degree rotation (further one-half turn). Thus, by turning the beam blocking element by a full turn (360° turn), the beam blocking element can oscillate (i.e., move forth and back) between the minimum overlap position and maximum overlap position. Further, the rotation of the rotating shaft and beam blocking element may not be limited to one full revolution. They can be rotated multiple revolutions without limitation in either direction. The beam blocking element oscillates thereby between the minimum overlap position and maximum overlap position with an oscillation period of 360°. Therefore, any overlap position between the minimum and maximum overlap positions can repeatedly be reached by simply continuing turning the rotating shaft in one direction. Although forth and back movement is possible, there is no need to change the direction of rotation of the rotating shaft because starting from a current overlap position any other overlap position between the minimum and maximum positions (including the minimum position and maximum position) can be obtained within a further full revolution of the rotating shaft. Hence, there is no need for a forth and back movement of the beam blocking element in order to adjust different overlap positions. Thus, the control of the beam blocking element position can be further simplified.

The beam blocking element may comprise a rotationally symmetric body with a lateral surface defining a beam blocking edge for the output X-ray beam. The beam blocking element may be mounted on the rotating shaft such that a rotation axis of the rotationally symmetric body is substantially parallel to the rotation axis of the rotating shaft, but located offset therefrom. Due to this offset, the body may carry out an eccentric rotation about the shaft axis so that the beam blocking edge can oscillate between the predetermined minimum beam overlap position and maximum beam overlap position.

The lateral surface of the rotationally symmetric body may be the body surface along its circumferential direction. Further, the beam blocking edge may be defined by a contour of the lateral surface. The contour may be defined by the one-dimensional lateral body edge obtained from a projection of the rotationally symmetric body onto a cross-sectional plane being substantially perpendicular to the direction of propagation of the output X-ray beam. Due to the eccentric rotation, the body may increasingly or decreasingly overlap with the output X-ray beam and, accordingly, the body contour can move further into or out of a beam cross-sectional area lying within the plane. Thus, the body may function as variable slit or aperture for the output X-ray beam with the lateral surface as a movable slit or aperture edge.

The contour of the lateral surface defining a beam blocking edge may further align with a cross-sectional shape of the output X-ray beam. The shape of the beam cross-section may be substantially perpendicular to the beam propagation direction. For instance, if the cross-sectional shape of the output X-ray beam may be rectangular, the beam blocking element body may be a cylinder having a lateral surface contour of a straight line that may be aligned with a side of the rectangular shape of the output beam. Alternatively, if the cross-sectional shape of the output X-ray beam is diamond-shaped, the body of the beam blocking element may be a double cone, having an L-shaped contour which is aligned with two sides of the diamond-shaped cross-sectional area.

Independent of the above described geometrical form, the beam blocking element (beam blocking element body) may be made of a material which effectively absorbs X-rays. According to one variant, the beam blocking element may be made of bronze.

The beam blocking element may be securely mounted on the rotating shaft. The rotating shaft, in turn, may be rotatably born by a bearing unit. The bearing unit may be arranged after the X-ray optics. For instance, the bearing unit may be arranged at or in the vicinity of the distal end of the X-ray optics (i.e., the end facing away from the X-source). Further, the bearing unit may be mounted such that the rotating shaft may be located off the beam. That is, the rotating shaft may not overlap with the output X-ray beam.

The X-ray optical device may further comprise a casing designed for receiving at least one bearing unit, the rotating shaft and the beam blocking element. Further, the casing may be designed for additionally receiving the X-ray optics. The casing may be designed as an air-tight casing which can be evacuated and/or filled with a protective gas.

The X-ray optical device may also comprise at least one sealing element arranged for realizing an airtight seal around the rotating shaft. For instance, O-rings may be used as sealing elements.

In order to obtain a desired beam overlap position, the rotating shaft may be turned either manually or automatically. For implementing an automated shaft rotation, the X-ray optical device may further comprise a driving unit operatively connected to the rotating shaft and configured to rotate the shaft by predetermined angles of rotation. Further, the X-ray optical device may also comprise a sensor unit configured to measure the current angular position and/or angular displacement of the shaft during shaft rotation. Since each angular position can be assigned to a specific overlap position of the beam blocking element, the current overlap position can be easily adjusted by setting a corresponding angle of rotation for the shaft.

The driving unit may comprise an electrical motor configured to generate a torque and a transmission unit configured to transmit the torque to the shaft. As transmission unit, a belt drive may be used. However, other transmissions are also conceivable for transmitting the motor torque to the shaft.

The X-ray optical device may further comprise a control unit. The control unit may be in communication with the sensor unit, driving unit, and an external input device. The control unit may be programmed to determine an actual beam overlap position of the beam blocking element based on the angular position of the rotating shaft measured by the sensor unit, to compare the actual overlap position with a set beam overlap position received from the input device, and to generate, based on the comparison, a motor signal that controls the motor of the driving unit to drive the rotating shaft to an angular position that corresponds to the set overlap position. For this purpose, the controller may comprise at least one processor for processing software routines implementing the above-described control steps.

The X-ray optics of the X-ray optical device may comprise at least one reflective element shaped to focus the X-ray beam onto a predetermined focal point with a predetermined focal length. The at least one reflective element may be designed as multilayer mirror with (laterally or depth) graded d-spacing. According to one variant, a Goebel optics may be realized comprising only one reflective mirror. According to an alternative variant, a Montel optics may be realized comprising two reflective mirrors mounted side by side and mutually perpendicular.

The X-ray optics may further comprise a collimator arranged after the X-ray optics and configured to further refine the beam of X-rays in between the X-ray optics and the sample to be analyzed. The collimator may comprise a pipe with one or more pinholes or a capillary pipe or any other collimator elements for beam refining. According to one implementation variant, the beam blocking unit may be arranged after the X-ray optics but before the collimator. According to an alternative implementation variant, the beam blocking unit may be arranged after the X-ray optics and the collimator.

The X-ray source of the X-ray optical device may be a conventional X-ray generator configured to generate X-rays by bombarding metal targets with high-velocity electrons accelerated by strong electric fields. The metal target may be implemented as rotating or fixed target. Further, as a metal target, chromium (Cr), cobalt (Co), copper (Cu), molybdenum (Mo), silver (Ag) or iron (Fe) target may be used.

According to another aspect of the invention, a method of operating the above described X-ray optical device is provided. The may include the steps of generating, by the X-ray source, an X-ray beam, imaging, by the X-ray optics, the X-ray beam onto a sample to be analyzed, collimating, by the collimator, the beam of X-rays to be imaged to the sample, and adjusting a divergence angle and/or intensity of the imaged X-ray beam in dependence of the sample to be analyzed. The adjusting step may include moving the beam blocking element towards a desired beam overlap position by rotating the rotating shaft of the beam blocking unit by a predetermined angle of rotation.

The adjusting step may be performed automatically by the above-mentioned control unit and driving unit which is mechanically coupled with the rotating shaft.

According to still another aspect, an X-ray analysis system is provided, comprising the above described X-ray optical device, a sample stage configured to hold and orient a sample to be analyzed relative to the X-ray beam output by the X-ray optical device, and an X-ray detector configured to detect X-rays scattered by the sample.

The X-ray analysis device may be an X-ray diffractometer designed for analyzing crystalline or powder samples. With the crystalline sample, a sample may be prepared in monocrystalline or polycrystalline form.

The sample stage may be designed to position the sample in an arbitrary position and orient the sample relative to the output beam. In particular, the stage may be designed for rotating the sample in two different directions.

The X-ray detector may be configured to detect the scattered X-ray beam. As X-ray detector, a commercially available one-dimensional or two-dimensional X-ray detector may be used, which is configured to measure the intensity of X-ray beams diffracted from the sample as a function of position, time, and energy.

Further objects, features, and advantages of this invention will become readily apparent to persons skilled in the art after a review of the following description, with reference to the drawings and claims that are appended to and form a part of this specification.

DETAILED DESCRIPTION

In the following description, for explanation and not limitation, specific details are outlined to provide a thorough understanding of the X-ray analysis system and X-ray optical device presented herein. It will be apparent for one skilled in the art that the disclosed X-ray analysis system and X-ray optical device may deviate within the scope of protection from specific details set forth hereinafter.

Figure 1:
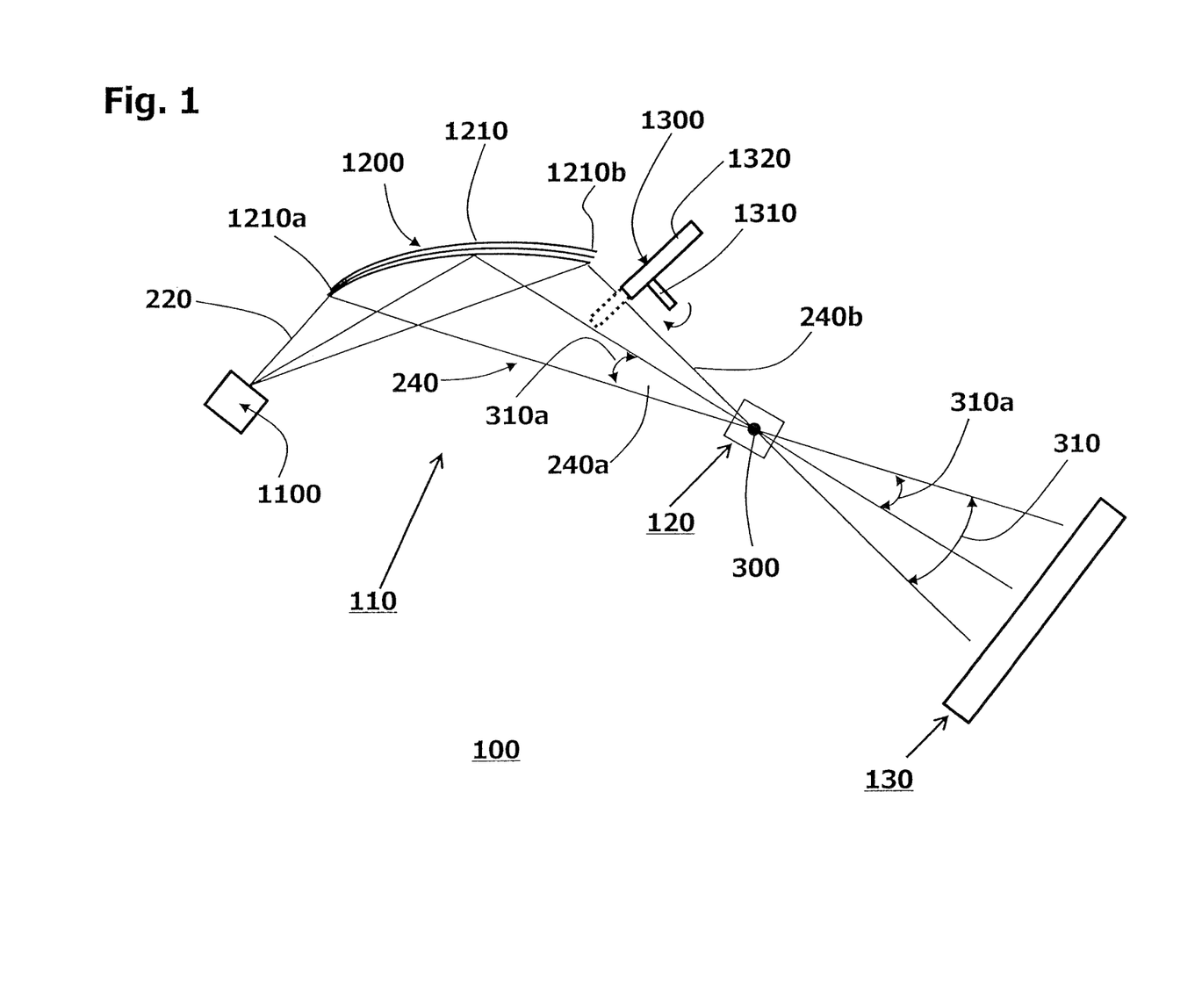
FIG. 1 is a schematic drawing of an X-ray analysis system according to the present invention.

FIG. 1 illustrates a schematic representation of an X-ray analysis system 100 according to the claimed invention. The X-ray analysis system 100 is an X-ray diffractometer designed for carrying out X-ray diffraction analyses on crystalline samples 300. The X-ray analysis system 100 comprises an X-ray optical device 110, a sample stage 120 and an X-ray detector 130. The X-ray optical device 110, in turn, comprises an X-ray source 1100, an X-ray optics 1200, and an X-ray beam blocking unit 1300. The X-ray optical device 110 may also comprise a collimator (not shown in FIG. 1) for refining the imaged beam.

The X-ray source 1100 of the X-ray optical device 110 is configured to generate X-ray radiation 220. For this purpose, a conventional X-ray generator may be employed which is configured to generate X-rays 220 by bombarding a static or rotating metal target with high-velocity electrons accelerated by strong electric fields. As metal target, a chromium (Cr), cobalt (Co), copper (Cu), molybdenum (Mo), silver (Ag) or iron (Fe) target may be used. According to a preferred implementation, a copper or molybdenum target is used.

The sample stage 120 is configured to hold the sample 300 in predetermined orientations relative to the X-ray beam 240 output from the X-ray optics 1200. In order to orient the sample 300 with respect to the X-ray beam 240, the stage 120 may be rotatable in at least two independent directions.

The X-ray detector 130 is configured to measure intensity, spatial distribution, spectrum and/or other properties of the X-rays scattered by the sample 300. Conventional scintillation detectors or gas-filled detectors may be used, as known from the prior art.

The X-ray optics 1200 is arranged between the X-ray source 1100 and the sample stage 120. The X-ray optics 1200 is arranged and configured such that a monochromatic X-ray beam 240 of predetermined shape is generated from the X-rays 220 of the X-ray source 1100 and imaged to a specific region where a sample 300 can be placed. For this purpose, the X-ray optics 1200 may be designed as X-ray focusing optics comprising at least one reflective element 1210, such as a multilayer mirror with (laterally or depth) graded d-spacing. The surface of the reflective element 1210 may be shaped such that an X-ray beam 240 with a predetermined shape, size, intensity and convergence and divergence angle 310 at the image focus is obtained.

The beam blocking unit 1300 of the X-ray optical device 110 is disposed at the exit (i.e., distal end) of the X-ray optics 1200. The beam blocking unit 1300 comprises a beam blocking element 1320 and a rotating shaft 1310. The rotating shaft 1310 is disposed laterally and does not overlap with the output X-ray beam 240.

Figure 2:
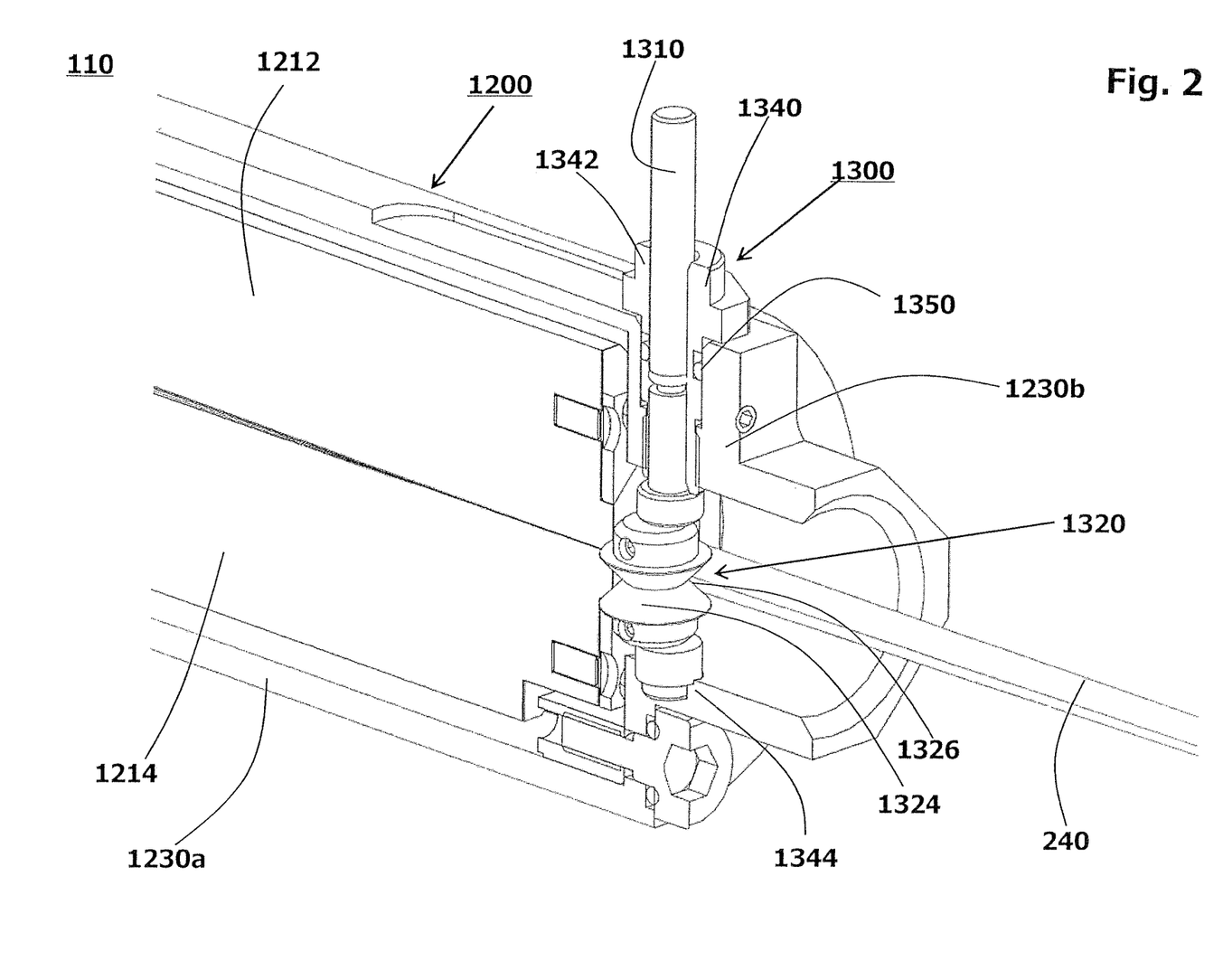
FIG. 2 is a three-dimensional view of a portion of an X-ray optical device according to an embodiment of the present invention.

According to the implementation illustrated in FIG. 2, the rotating shaft 1310 and the beam blocking element 1320 are arranged close to a beam side where the beam 240 has its lowest intensities. An alternative implementation is also conceivable, in which the rotating shaft 1310 and the beam blocking element 1320 are arranged at the opposite side, i.e., in the vicinity of a beam side where the beam 240 has its highest intensity. In this context, it is noted that the beam intensity may not be uniform over the reflective element 1210 and may vary from its near end 1210a (i.e., the reflective element end closest to the X-ray source 1100) to its far end 1210b (i.e., the reflective element end farthest away from the X-ray source 1100) due to different X-ray capture angles at the near end 1210a and far end 1210b of the reflective element 1210. Generally, X-ray beam portions 240a reflected from reflective element portions at or close to the near end 1210a have a higher intensity than beam portions 240b reflected from reflective element portions at or close to the far end 1210b.

Independent of the above described arrangement at the near end beam side or far end beam side, the beam blocking element 1320 is mounted eccentrically on the rotating shaft 1310 so that a rotation of the rotating shaft 1310 around its axis (see arrow in FIG. 2) causes an eccentric rotation of the beam blocking element 1310 around the rotating shaft 1310 and thereby a rotation-dependent movement of the beam blocking element 1320 relative to the output X-ray beam 240. That is, due to the eccentric arrangement of the beam blocking element 1320 (i.e., a centre of gravity axis of the beam blocking element 1320 is offset to the axis of the rotating shaft 1210) at least a portion of the laterally arranged beam blocking element 1320 can be rotated into the output X-ray beam 240. Accordingly, the output X-ray beam 240 can at least be partially overlapped by the beam blocking element 1320 so that only a remaining non-overlapped beam portion 240a can pass through the beam blocking unit 1300.

In FIG. 1, the beam blocking element 1320 is shown to assume two different beam overlap positions, i.e., a minimum overlap position (solid line representation of the beam blocking element 1320) and a maximum overlap position (see dashed line representation). In the present case, the minimum overlap position corresponds to a non-overlapping position, where the beam blocking element 1320 is turned away from the output X-ray beam 240 and does not overlap with the output X-ray beam 240 at all. In this case the X-ray beam 240 output by the X-ray optics 1200 can pass through the blocking unit 1300 as a whole. However, it is also conceivable that the beam blocking unit 1300 is designed such that a small overlap between the beam blocking element 1320 and the output X-ray beam 240 still remains even in the case the beam blocking element 1320 is rotated away from the output X-ray beam. In such a case a small beam portion is also blocked off in the minimum overlap position.

The maximum overlap position corresponds to the position where a maximum overlap between the beam blocking element 1320 and the X-ray output beam 240 is reached. From the drawing in FIG. 1 it becomes clear that the maximum overlap position reachable by the beam blocking element 1320 mainly depends on the geometric dimensions of the beam blocking element 1320. For instance, the beam blocking element 1320 can be dimensioned in directions perpendicular to the rotating shaft 1310 such that the whole X-ray beam 240 or only a portion 240a thereof is overlapped by the beam blocking element 1320, when the beam blocking element 1320 reaches its maximum overlap position. In FIG. 1, only for the purpose of explanation but not of limitation, the beam blocking element 1320 at the maximum overlap position only blocks off a portion 240b of the output X-ray beam 240. The remaining unblocked beam portion 240a can still pass through the blocking unit and reach the sample 300. Accordingly, the convergence angle or, equivalently, the divergence angle 310a of the remaining unblocked beam portion 240a is reduced compared to the convergence angle or divergence angle 310 of the whole beam 240.

The minimum overlap position and the maximum overlap position of the beam blocking element 1320 can be each associated with a specific angular position of the rotating shaft 1310. In the present case the beam blocking element 1320 is designed and born on the rotating shaft 1310 such that the minimum overlap position can be associated with a 0° angular position and the maximum overlap position with a 180° angular position of the rotating shaft 1310. In other words, when starting from the minimum overlap position, the maximum overlap position is obtainable after a 180° turn of the rotating shaft 1320. Further, any overlap position between the minimum overlap position and the maximum overlap position can be obtained by simply rotating the rotating shaft 1310 about a corresponding angle of rotation between 0° and 180°. Thus, by choosing appropriate angles of rotation for the rotating shaft 1310 any desired overlap position between the predefined minimum and maximum overlap positions can be adjusted. Accordingly, desired portions of the beam 240 can be selectively blocked off so that the convergence/divergence angles 310 can be selectively adjusted to the experimental needs.

The beam blocking element can be rotated multiple revolutions without limitations. By carrying out one full revolution (i.e. 360° turn) the beam blocking element 1320 can be moved from the minimum overlap position (or non-overlapping position) to the maximum overlap position and back to the initial minimum overlap position. As the beam blocking element 1320 oscillates with a rotation period of 360° between the minimum overlap position and maximum overlap position, there is no need to change the direction of rotation regardless of whether the beam blocking element 1320 is turned into the beam or out therefrom.

In the following, the operation of the X-ray system 100 will be further described. In operation, the X-ray source 1100 emits X-rays (e.g. X-ray generated by a Cu-target) towards the reflective optics 1200. The reflective optics 1200, in turn, reflects X-rays of a selected wavelength (for instance Cu-Kα) in form of an X-ray beam of predetermined cross-sectional area and cross-sectional shape towards a crystalline or powder sample 300 to be investigated. The shape and cross-sectional area of the X-ray beam depends on the X-ray optics design and may vary between different design implementations.

The sample 300 is mounted on the sample stage 120 and can be oriented by means of the stage 120 with respect to the X-ray beam 240. The sample orientation can be changed by rotating the sample 300 during X-ray beam exposure. The X-ray beam 240 is diffracted by the sample 300. The intensity and spatial distribution of the diffracted X-ray beams at different sample orientations are recorded by means of the detector 130 and, based thereon an X-ray diffraction pattern is generated. The obtained X-ray diffraction pattern comprises spaced apart discrete spots for crystalline samples or lines for powder samples.

The resolution of X-ray diffraction patterns (i.e., the distinguishability of adjacent spots or lines) depends on the divergence angle of the X-ray beam 240 output by the X-ray optics 1200. For samples 300 with large unit cells, an output X-ray beam 240 with small divergence angle is desired in order to improve the pattern resolution. An X-ray beam 240 with small divergence angle can be reached by simply rotating the beam blocking element 1320 to a desired overlap position (see, for instance, FIG. 1). Since in FIG. 1 the beam blocking element 1320 is arranged to block off the weak beam portion 240*b* of the output X-ray beam 240, X-ray beams with small divergence angle can be obtained at the sample 300 without restricting too much the beam intensity. Thus, the beam blocking element 1320 functions as adjustable aperture capable of restricting the output X-ray beam 240 to beams of desired divergence angles.

Furthermore, the beam blocking element 1320 can be used to adjust the intensity of the output X-ray beam 240 reaching to the sample 300. For the case of a strongly diffracting sample 300 the diffracted intensity reaching the detector 130 may be too intense to be measured correctly and in such a case the beam blocking element 1320 can be simply rotated to a desired overlap position in order to achieve a reduced X-ray beam intensity on the sample 300.

In conjunction with FIG. 2 an implementation of the X-ray optical device 110 will be further described. More specifically, an implementation of the X-ray optics 1200 and beam blocking unit 1300 of the X-ray optical device 110 is further described.

FIG. 2 illustrates a three-dimensional view of an end portion of the X-ray optics 1200 which is faced away from the X-ray source 1100. The X-ray optics 1210 comprises two reflective mirrors 1212, 1214 and a casing 1230*a* for receiving the mirrors 1212, 1214. The X-ray optics 1200 may further comprise a pivoting mechanism 1240 for pivoting the casing 1230*a* in at least one direction and an outer housing 1230*c* for receiving the casing 1230*a* and the pivoting mechanism 1250 (not shown in FIG. 2, but visible in FIG. 4). Moreover, the outer housing 1250 may be provided with pins 1260 at its proximal end through which the housing 1250 can be mechanically connected to the X-ray source 1100.

The two reflective mirrors 1212, 1214 are designed and arranged to generate a monochromatic X-ray beam 240. A fixed aperture may be provided at the distal end of the mirrors 1212, 1214. The fixed aperture is designed to let pass only the monochromatic X-ray beam reflected by the two mirrors 1212, 1214 and to block other X-ray beam portions, such as beam portions that are reflected from a single mirror only (not shown in FIG. 2). The generated X-ray beam 240 has a predetermined cross-sectional size and shape which depends on the design details of the used mirrors 1212, 1214. In the present implementation, only for the purpose of explanation but not of limitation, a mirror arrangement is used generating and outputting a diamond-shaped X-ray beam 240.

The beam blocking unit 1300 of the X-ray optical device 110 is arranged at the distal end of the X-ray optics 1210. It comprises the rotatable beam blocking element 1320 and the rotating shaft 1310 on which the beam blocking element 1320 is eccentrically mounted. It further comprises a bearing unit 1340 configured to rotatably support the rotating shaft 1310 and at least one sealing element 1350.

The beam blocking unit 1300 is received by casing 1230*b* fixed at the distal end to the mirror casing 1230*a*. According to an alternative implementation, the beam blocking unit 1300 can directly received by the mirror housing 1230 at its distal end.

The bearing unit 1340 comprises a sleeve 1342 arranged on an upper side of the casing 1230*b* and configured to receive an upper portion of the rotating shaft 1310. The sleeve 1340 also comprises a recess arranged at the outer sleeve surface and in circumferential direction of the sleeve 1342. The recess 1350 is configured to partially receive a sealing element 1350 (i.e., an O-ring) for providing a gas-tight sealing between sleeve 1340 and casing 1230*b*. Further, the bearing unit 1340 comprise a bearing recess 144 arranged at a lower side of the casing 1230*b* and configured to receive the lower end portion of the rotating shaft 1310. The bearing unit 1340 is arranged such that the rotating shaft 1310 is disposed laterally offset to the output beam 240. That, is the rotating shaft 1310 does not overlap with the X-ray beam 240.

The beam blocking element 1320 comprises a rotationally symmetric body 1324 arranged eccentrically on the rotating shaft 1310. Further, in axial direction along the rotating shaft 1310, the body 1324 is mounted at the height of the output X-ray beam 240. The body 1324 has the shape of a double cone with truncated apices. Accordingly, the body 1324 has a lateral surface 1326 with an L-shaped lateral contour 1326a defining a beam blocking edge for the output beam 240. In the present implementation, the shape of the beam blocking edge is adapted to the cross-sectional shape of the X-ray beam 240. It represents two sides of the diamond-shaped beam 240 (see also FIGS. 3a and 3b).

Figure 3A:
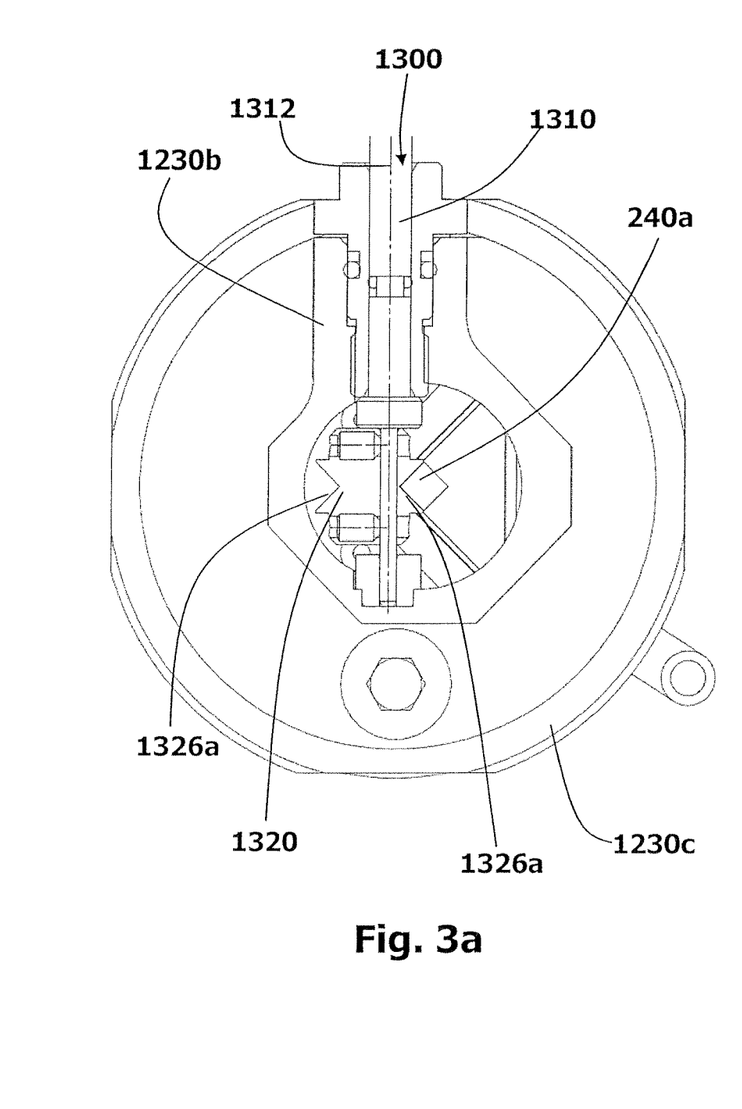
FIGS. 3a-3b are cross-sectional views of the X-ray optical device illustrated in FIG. 2.
Figure 3B:
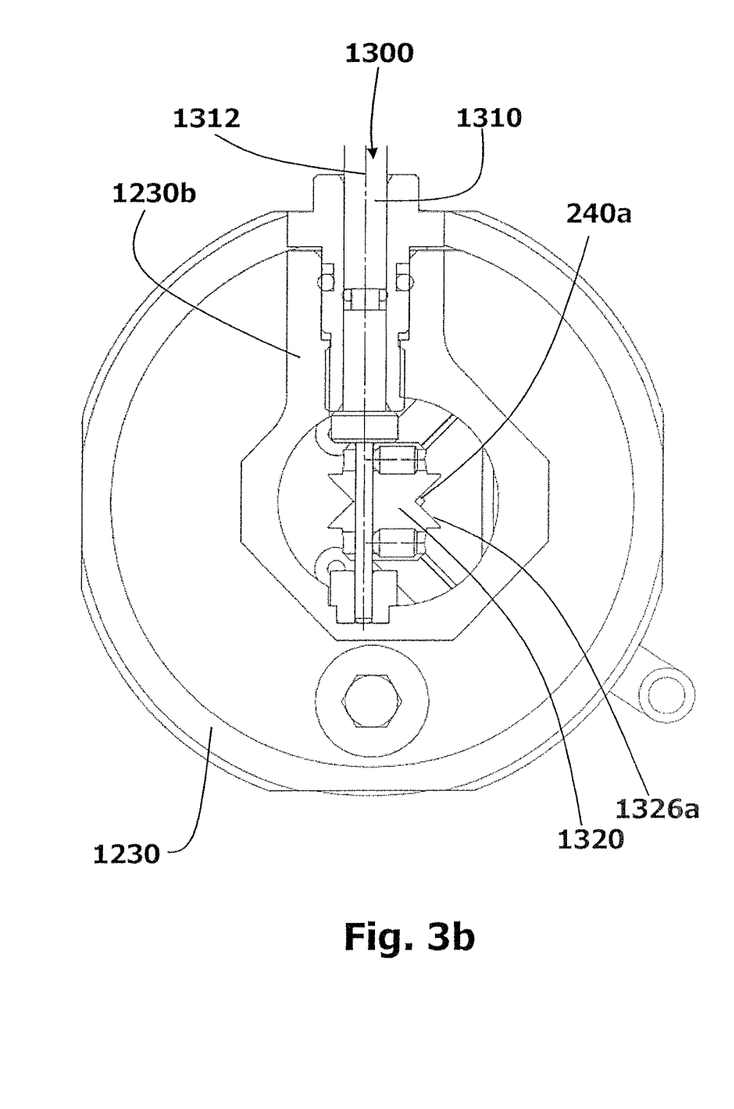

The operation of the beam blocking unit 1300 of FIG. 3 will be further described in conjunction with FIGS. 3a and 3b. FIGS. 3a and 3b are both side views of the distal end of the X-ray optical device 110 illustrated in FIG. 2. Components of the X-ray optical device 110 having the same structural and/or functional features are provided with the same reference numerals. For the sake of clarity, only the most prominent components have been provided with reference numerals.

FIG. 3a illustrates the position in which the beam blocking element 1320 is fully rotated out from the X-ray beam 240. That is, in this position the beam blocking element 1320 does not overlap with the X-ray beam 240. This position corresponds to the above-mentioned minimum overlap position and can be associated with a 0° angular position of the rotating shaft 1310. In this position, the output X-ray beam 240 has its maximum cross-sectional area 240a. By turning the rotating shaft 1310 by 180°, the body 1324 is turned into the X-ray beam 240 so that the lateral contour 1326a of the body continuously moves into the beam 240. As a consequence, the beam cross-sectional area 240a continuously shrinks and becomes minimal at 180° rotation where the maximum overlap position is reached (see FIG. 3b).

As already mentioned above, the degree of overlap at the maximum overlap position depends on the design of the beam blocking element 1320, in particular on its lateral extension. In FIG. 3b only a small X-ray portion having a small cross-sectional area 240a can pass through the blocking unit 1300, whereas a major portion of the beam 240 is occluded by the beam blocking element 1320. It is conceivable to dimension the body 1324 such that the beam cross-sectional size 240a is reduced by 80% to 98% with respect to the initial cross-sectional size when reaching the maximum overlap position. Alternatively, it is also conceivable to dimension the body 1324 such that a complete beam blocking is achieved when reaching the maximum overlap position.

In order to reduce X-ray scattering at the body surface 1326, the body 1324 is made of a material having excellent X-ray absorption properties. For instance, bronze may be used for the body.

Figure 4:
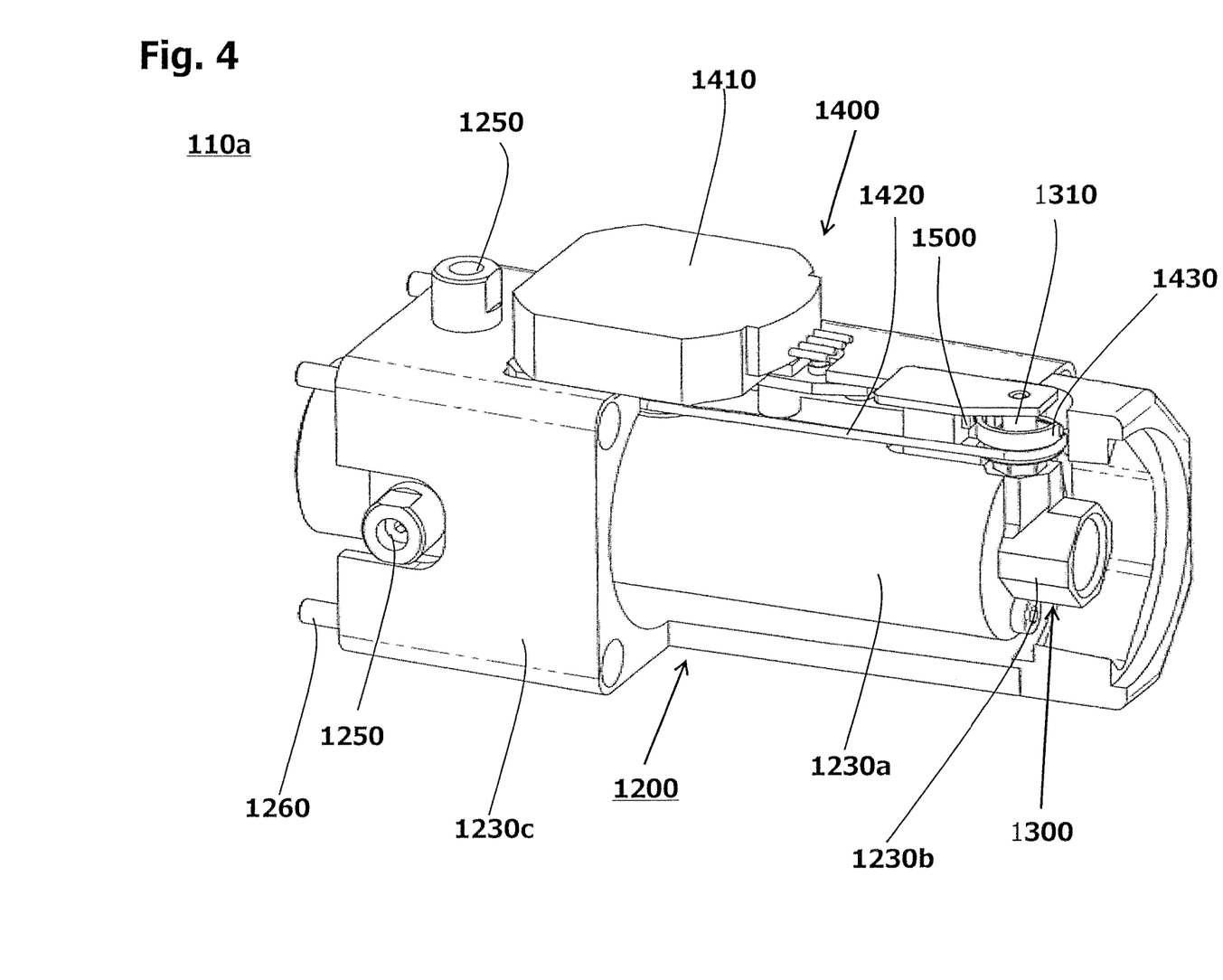
FIG. 4 is a three-dimensional view of a portion of an X-ray optical device according to an embodiment of the present invention.
Figure 5:
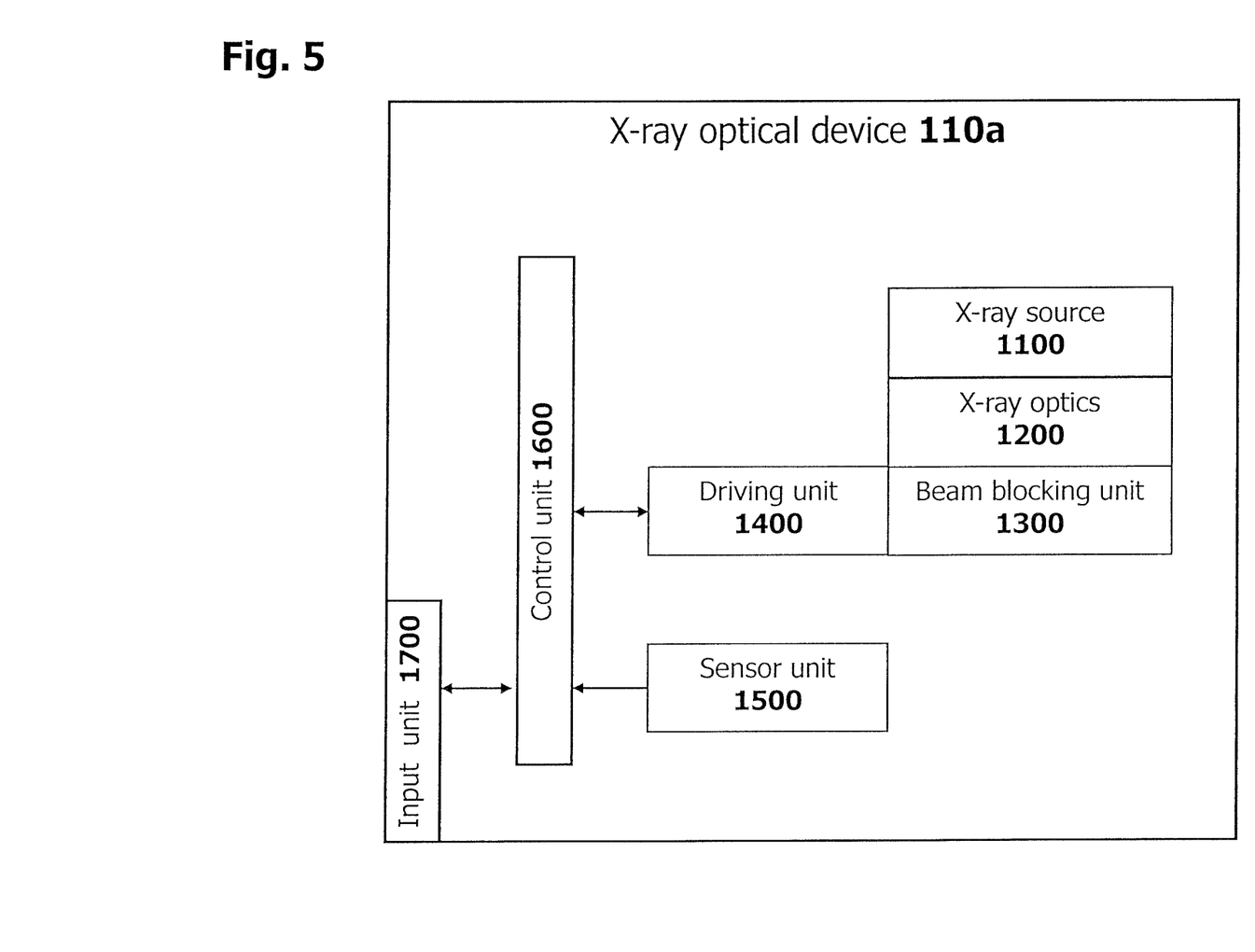
FIG. 5 is a block diagram of the X-ray optical device of FIG. 4.

With reference to FIGS. 4 and 5 an X-ray optical device 100a according to a further implementation will be discussed. The X-ray optical device 100a comprises the X-ray source 1100, X-ray optics 1200 and aperture device 1300 of the implementation discussed above in conjunction with FIGS. 2, 3a and 3b. These components will not be described again. Instead reference is made to the corresponding description above. Additionally, the X-ray optical device 100a further comprises a driving unit 1400, a sensor unit 1500, a control unit 1600 and an input unit 1700 (see also FIG. 5).

The driving unit 1400 comprises an electrical motor 1410 configured to generate a torque. Further, the driving unit 1040 comprises a transmission unit in the form of a belt drive. The belt drive comprises a belt 1420 arranged to transmit the torque generated by the motor 1410 to a pulley 1430 mounted at the upper end of the rotating shaft 1310. The driving unit 1400 is arranged at the upper side of the housing 1230.

The sensor unit 1500 is configured to measure the angular position of the rotating shaft 1310 and/or an angular displacement of the rotating shaft 1310 during shaft rotation. For this purpose, an optical sensor may be used which is arranged close to the rotating shaft 1310.

The input unit 1700 (only shown in the block diagram of FIG. 6) is configured to receive user inputs. The user input may be indicative of a beam overlap position, rotating angle for the rotating shaft 1310 and/or a beam property, such as the divergence angle 310 of the beam 240. Since these quantities correlate with each other, the control unit 1600 can use each quantity for generating appropriate motor control signals.

The control unit 1600 (only shown in the block diagram of FIG. 5) is in communication with the sensor unit 1500, the driving unit 1400 and the input unit 1700. The control unit 1600 may be programmed to determine an actual overlap position of the beam blocking element 1320 (or its lateral edge 1326a) based on the angular position of the rotating shaft 1310 measured by the sensor unit 1500, to compare the actual overlap position with a set overlap position received from the input device 1700, and to generate, based on the comparison, a motor signal that controls the motor 1410 to drive the motor 1410 to an angular position that corresponds to the set overlap position. For this purpose, the controller 1600 comprises at least one processor for processing software routines implementing the above-described control steps.

The above-described beam blocking technique has many advantages. The blocking technique can be easily combined with conventional X-ray optics because the rotating shaft 1310 and beam blocking element 1320 can be easily combined with conventional X-ray optics. Further, the blocking technique is mechanically robust and cheap because expensive high precision threads or micrometer screws are not used. Still further, the described technique facilitates the adjustment of a desired overlap position and, therefore, the adjustment of desired beam divergence angles and/or bean intensities because any position between a predefined minimum overlap position and maximum overlap position can easily be selected by simply rotating the rotating shaft in one direction. There is no need to reverse the shaft rotation because the blocking element oscillates between the minimum and maximum overlap position with each new shaft revolution.

As a person skilled in the art will readily appreciate, the above description is meant as an illustration of the principles of this invention. This description is not intended to limit the scope or application of this invention in that the invention is susceptible to modification, variation, and change, without departing from the spirit of this invention, as defined in the following claims.

The invention claimed is:

1. An X-ray optical device, comprising:
an X-ray source configured to emit X-rays;
an X-ray optics configured to image a beam of X-rays generated by the X-ray source onto a sample to be analyzed;
a beam blocking unit arranged for selectively blocking off at least a portion of the X-ray beam output by the X-ray optics;
the beam blocking unit comprising a rotating shaft and a beam blocking element, wherein the rotating shaft is rotatable by a driving unit around a rotating shaft axis and arranged laterally offset with respect to the X-ray beam output by the X-ray optics;

wherein the beam blocking element is mounted eccentrically on the rotating shaft such that the beam blocking element is movable into different beam overlap positions for blocking off corresponding portions of the beam when the beam blocking element is eccentrically rotated around the rotating shaft axis;

a sensor unit configured to measure an angle of rotation or angular position of the shaft rotated by the driving unit; and a control unit, wherein the control unit is in communication with the sensor unit, the driving unit and an external input device, wherein the control unit is configured to:

determine an actual beam overlap position of the beam blocking element based on the angular position of the rotating shaft measured by the sensor unit;

compare the actual beam overlap position with a set beam overlap position received from the input device; and based on the comparison, generate a signal that controls the driving unit to drive the rotating shaft to an angular position that corresponds to the set beam overlap position.

2. The X-ray optical device according to claim 1, wherein the beam overlap position of the beam blocking element depends on the angle of rotation of the rotating shaft.

3. The X-ray optical device according to claim 1, wherein the beam blocking element is movable into any position between a predetermined minimum overlap position and a predetermined maximum overlap position by selecting a corresponding angle of rotation between 0° and 180°.

4. The X-ray optical device according to claim 1, wherein the beam blocking element is movable from a minimum overlap position to a maximum overlap position and from the maximum overlap position back to the minimum overlap position by turning the rotating shaft one full revolution.

5. The X-ray optical device according to claim 1, wherein the beam blocking element comprises a rotationally symmetric body with a lateral surface defining a beam blocking edge for the X-ray beam.

6. The X-ray optical device according to claim 1, further comprising:

a bearing unit designed for rotatably bearing the rotating shaft; and a casing designed for receiving the bearing unit, the rotating shaft and the beam blocking element.

7. The X-ray optical device according claim 1, further comprising at least one sealing element designed for realizing an air-tight seal around the rotating shaft.

8. The X-ray optical device according to claim 1, wherein the driving unit comprises an electric motor configured to generate a torque and a belt drive configured to transmit the torque to the shaft.

9. The X-ray optical device according to claim 1, wherein the X-ray optics comprises at least one reflective element designed to image an X-ray beam with a predetermined focal length.

10. The X-ray optical device according to claim 1, further comprising a collimator configured to further refine the beam of X-rays in between the X-ray optics and the sample, wherein the beam blocking unit is either arranged after the X-ray optics, before the collimator or after the collimator.

11. A method of operating an X-ray optical device, the method comprising the steps of:

generating X-rays by an X-ray source;

imaging, by the X-ray optics, a beam of the X-rays from the X-ray source onto a sample to be analyzed;

collimating, by a collimator, the beam of X-rays to be imaged to the sample, the collimator located between the X-ray optics and the sample;

adjusting a divergence angle or intensity of the imaged X-ray beam in dependence of the sample to be analyzed, wherein the adjusting step comprises moving a rotating shaft and a beam blocking element towards a desired overlap position by rotating the rotating shaft by a predetermined angle of rotation, wherein the adjusting step is performed automatically by a control unit and a driving unit which is mechanically coupled to the rotating shaft.

12. An X-ray analysis system configured to analyze crystalline or powder samples, the system comprising:

an X-ray source configured to emit X-rays;

an X-ray optics configured to image a beam of X-rays generated by the X-ray source onto a sample to be analyzed;

a beam blocking unit arranged for selectively blocking off at least a portion of the X-ray beam output by the X-ray optics;

the beam blocking unit comprising a rotating shaft and a beam blocking element, wherein the rotating shaft is rotatable by a driving unit around a rotating shaft axis and arranged laterally offset with respect to the X-ray beam output by the X-ray optics;

wherein the beam blocking element is mounted eccentrically on the rotating shaft such that the beam blocking element is movable into different beam overlap positions for blocking off corresponding portions of the beam when the beam blocking element is eccentrically rotated around the rotating shaft axis;

a sensor unit configured to measure an angle of rotation or angular position of the shaft rotated by the driving unit;

a control unit, wherein the control unit is in communication with the sensor unit, the driving unit and an external input device, wherein the control unit is configured to:

determine an actual beam overlap position of the beam blocking element based on the angular position of the rotating shaft measured by the sensor unit;

compare the actual beam overlap position with a set beam overlap position received from the input device; and based on the comparison, generate a signal that controls the driving unit to drive the rotating shaft to an angular position that corresponds to the set beam overlap position;

a sample stage configured to hold and orient the sample to be analyzed relative to the X-ray beam output by the X-ray optical device; and an X-ray detector configured to detect X-rays scattered by the sample.

13. The system according to claim 12, wherein the beam overlap position of the beam blocking element depends on an angle of rotation of the rotating shaft.

14. The system according to claim 13, wherein the beam blocking element is movable from a minimum overlap position to a maximum overlap position and from the maximum overlap position back to the minimum overlap position by turning the rotating shaft one full revolution.

15. The system according to claim 12, wherein the driving unit comprises an electric motor configured to generate a torque and a belt drive configured to transmit the torque to the shaft.

16. The system according to claim 12, further comprising a collimator configured to further refine the beam of X-rays in between the X-ray optics and the sample, wherein the beam blocking unit is either arranged after the X-ray optics, before the collimator or after the collimator.

\* \* \* \* \*